United States Patent [19]

Naylor, III et al.

[11] 3,886,564
[45] May 27, 1975

[54] DEFLECTION SENSORS FOR INK JET PRINTERS

[75] Inventors: Hugh E. Naylor, III; Robert A. Williams, both of Lexington, Ky.

[73] Assignee: International Business Machines Corporation, Armonk, N.Y.

[22] Filed: Aug. 17, 1973

[21] Appl. No.: 389,290

[52] U.S. Cl. ............................. 346/75; 324/61 R
[51] Int. Cl. .......................................... G01d 13/00
[58] Field of Search .......... 346/75; 317/3; 324/61 S, 324/61 R

[56] References Cited
UNITED STATES PATENTS
3,787,882  1/1974  Fillmore et al. .................. 346/75
3,836,912  9/1974  Ghougasian et al. ............. 346/75

OTHER PUBLICATIONS

Ruddy, G. A., Position and Synchronization Sensor for an Ink Jet Printer; IBM Tec. Disc. Bulletin, Vol. 15, No. 9, pp. 2785–2786, February, 1973.

Naylor et al., Differential Synchronization Sensor; IBM Tec. Disc. Bulletin, Vol. 16, No. 3, pp. 776–777, August, 1973.

Fillmore et al., Deflection Servo Initialization; IBM Tec. Disc. Bulletin, Vol. 16, No. 3, pp. 1031–1033, August, 1973.

Primary Examiner—Joseph W. Hartary
Attorney, Agent, or Firm—D. Kendall Cooper

[57] ABSTRACT

Various ink droplet deflection sensor arrangements are described particularly involving differential sensing of signals developed from charged drops in order to reject large common mode noise signals. The arrangements have particular utility in sensing the height of deflected ink drops, thereby determining velocity, correct drop placement, ink stream failure, etc.

11 Claims, 25 Drawing Figures

Patented May 27, 1975 3,886,564

TEST DROPS
PRIOR ART

TEST DROPS
PRIOR ART $V_{OUT}$
LOW  HIGH  DROP LOCATION

TEST DROPS

TEST DROP
SENSE AMPLIFIER $185° > \phi > 90°$

LOGIC
CHARGE ELECTRODE DRIVER
PUMP
NOZZLE
CHARGE ELECTRODE
H.V.
PAPER
POP-UP GUTTER

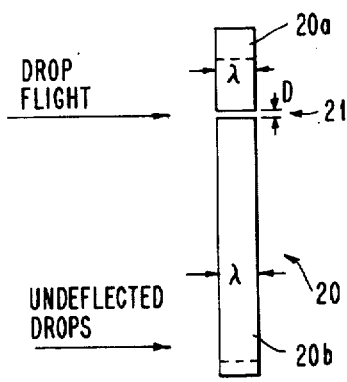
FIG. 6a
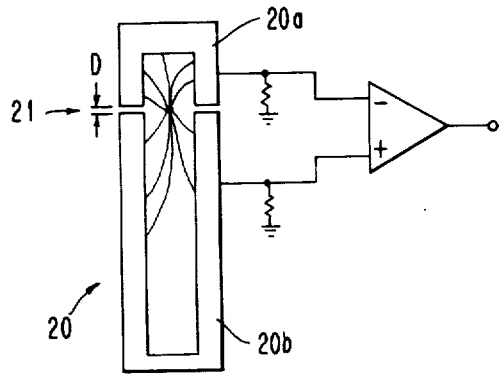
FIG. 6b
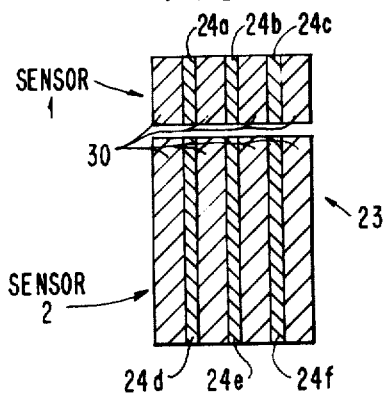
FIG. 7a
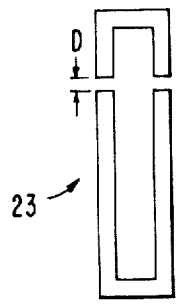
FIG. 7b
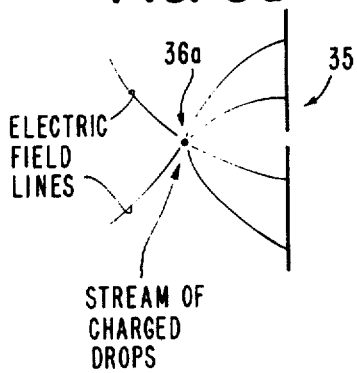
FIG. 8a
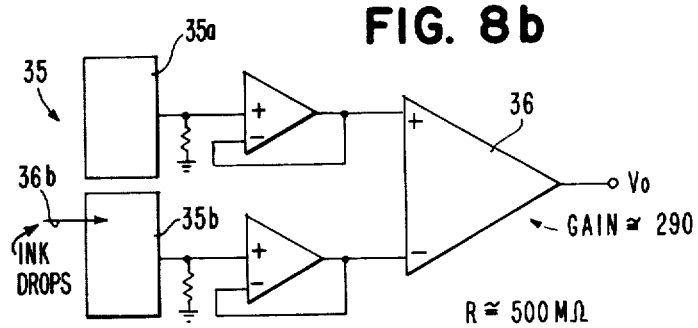
FIG. 8b
FIG. 9
a — STREAM TOO HIGH
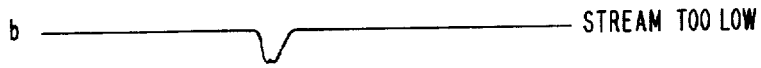
b — STREAM TOO LOW
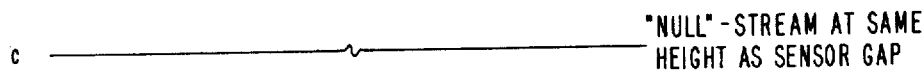
c — "NULL"-STREAM AT SAME HEIGHT AS SENSOR GAP Patented May 27, 1975  3,886,564

SENSOR CONFIGURATION

TAPERED SENSOR NO. 1

TAPERED SENSOR NO. 2

CENTERED CASE
PATH "A" FIG. 13

DROPS TOO LOW
PATH "B" FIG. 13

DEFLECTION SENSORS FOR INK JET PRINTERS

CROSS-REFERENCES

The following cases are hereby incorporated by reference:

U.S. Patent Application Ser. No. 313,886, having J. W. Woods, et al, as inventors, filed Dec. 11, 1972, and entitled "Ink Jet printing Apparatus with Overrun of Printhead to Insure Better Visibility and Counter Control of Printing Locations."

U.S. Patent Application Ser. No. 293,300, now U.S. Pat. No. 3,787,882 having G. L. Fillmore, et al, as inventors, filed Sept. 25, 1972, and entitled "Servo Control of Ink Jet Pump."

BACKGROUND OF INVENTION, FIELD AND PRIOR ART

The present invention has particular utility in the field of ink jet printing. Various schemes have been proposed heretofore for printing with drops of ink that are generated at extremely high frequencies, such as in the range of 100 kilohertz, or higher. In systems of this nature, such as that set forth in the Woods, et al, application referred to above, it is extremely important that the drops of ink be checked in order to determine that their velocity is correct, that their placement on the paper is correct, etc. An inductive type sensor is described in the U.S. patent application Ser. No. 313,913, now U.S. Pat. No. 3,836,912 having John Ghougasian, et al, as inventors, filed Dec. 11, 1972, and entitled "Drop Charge Sensing Apparatus for An Ink Jet Printing System." Typical systems in which the sensors described herein may be utilized are set forth in the Fillmore, et al case.

SUMMARY

The sensor arrangements according to the present invention particularly involve planar split sensors providing a gap between the upper and lower plates. The sensors are located to one side of the stream of ink drops and, with associated electronics, can determine if the ink drops are at the height of the gap or are above or below the gap. The two portions of the sensor are interconnected to two independent inputs of a differential sense amplifier in order to develop signals for corrective purposes. Various alternate sensor configurations are set forth. Another version involves incorporating some of the amplifying circuitry in the sensor itself. Further, multiple sensors may be used. The sensor configurations are particularly useful in an ink jet printer for determining the height and placement of drops in an ink jet stream of drops during actual printing operations as well as during adjustment procedures.

OBJECTS

The primary object of the present invention is to provide an improved ink drop deflection sensor for ink jet printers having a high level of efficiency and noise rejection as well as accuracy of sensing.

The foregoing and other objects, features, and advantages of the invention will be apparent from the following more particular description of the various embodiments of the invention as illustrated in the accompanying drawings.

DESCRIPTION OF THE DRAWINGS

FIGS. 6a and 6b illustrate an alternative sensor configuration.

FIGS. 7a and 7b illustrate a shielded sensor assembly.

FIGS. 8a and 8b further illustrate the planar sensor assembly with associated circuitry.

FIG. 9 shows typical wave forms at the output of a differential amplifier circuit used in the system.

DESCRIPTION

Figure 1A:
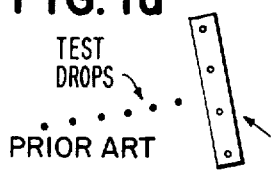
FIGS. 1a and 1b represent probe-type sensors heretofore known.
Figure 1B:
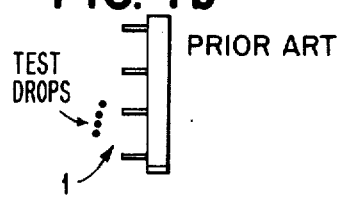

Some electrostatic sensing methods for measuring the height of deflected drops involve a number of small sensors in a linear array 1 normal to the flight path of the drops as shown in FIGS. 1a and 1b.

Since these sensors are small in size only a relatively small signal is induced on any one sensor. Also with each additional sensor, or sensor pair, an additional amplifier or amplifier pair is required. Logic must also be more complicated in order to determine which sensor is closest to the test drops, etc.

Figure 2A:
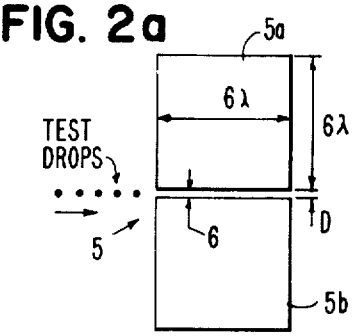
FIGS. 2a and 2b illustrate a planar sensor assembly useful in the present invention.
Figure 2B:
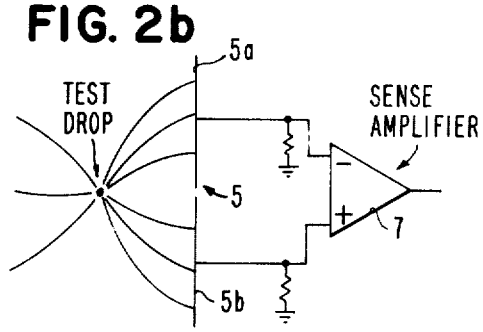

An alternative to the multiple sensor approach is shown in FIGS. 2a and 2b. Here, sensor 5 comprises two relatively large $6\lambda \times 6\lambda$ (where $\lambda$ is the drop to drop spacing) flat plates 5a and 5b that are located in the same plane a distance "D" apart.

Charged ink drops passing centered at the same height as the gap 6 between the plates induce equal charges, hence voltages on the two plates cause the amplifier 7 to have a "null," i.e. zero volts, output. Drops that are too high induce a larger signal on plate 5a causing the output of amplifier 7 to be positive. Drops that are too low cause amplifier 7 output to be negative. By sensing the polarity of the output signal, and changes in its polarity, a digital deflection control loop can initially make large changes in deflection and gradually make smaller changes until the amplifier is set at null output. Also, since signals are sensed differentially, large common mode noise signals are rejected by the amplifier.

Figure 3:
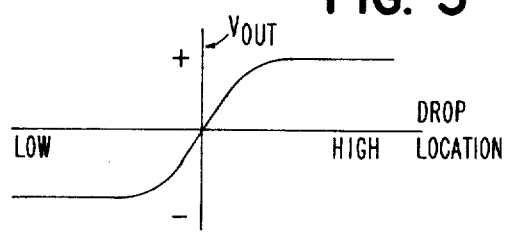
FIG. 3 is a plot of amplifier outputs vs. vertical position of a test drop pattern.
Figure 4A:
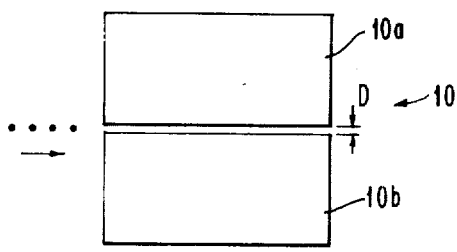
FIGS. 4a and 4b illustrate a planar sensor assembly comprising elements arranged at an angle with respect to one another.
Figure 4B:
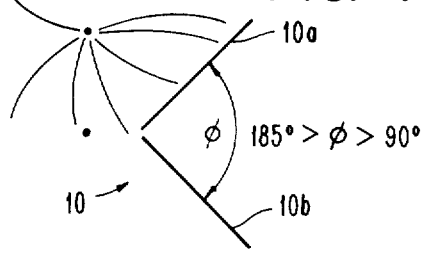

FIG. 3 is a hypothetical plot of amplifier outputs vs. the vertical position of the test drop pattern. If a more rapid change in the slope of the amplifier output is desirable in order to obtain better resolution, this can be achieved by a sensor 10 using angled plates 10a, 10b, shown in FIGS. 4a and 4b, or by controlling the transfer characteristics of the sensor amplifiers.

With plates angled, once a drop is significantly above or below the gap, it induces a large signal only on one plate and a relatively smaller (compared to the planar plate case) signal on the other plate. This improves resolution since a given change in drop position (up or down), away from the gap, produces a large amplifier output signal change.

Figure 5:
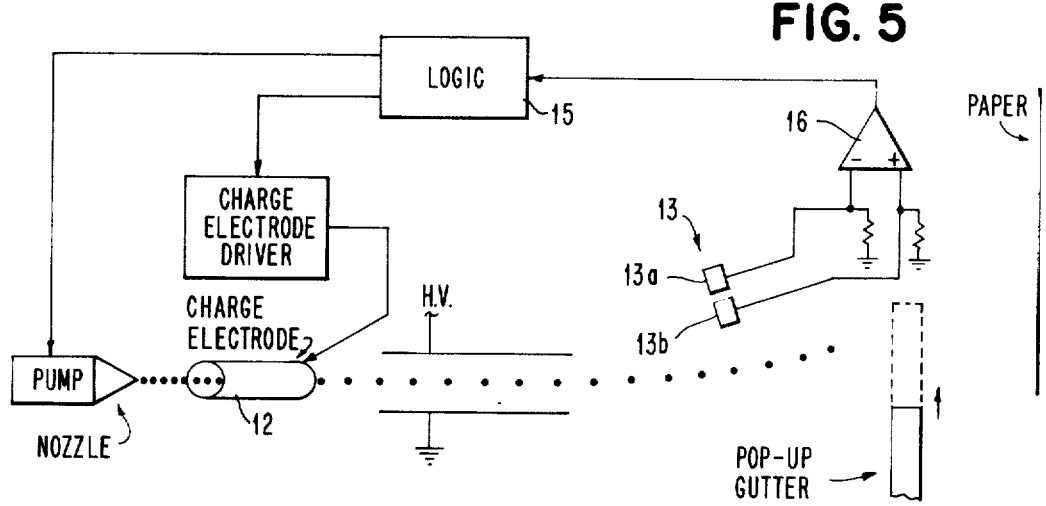
FIG. 5 illustrates a typical ink jet printer system in which the sensor assembly is incorporated.

FIG. 5 illustrates a deflection sensor in relation to other system components. With a nominal distance of 0.750 inches from the charge electrode 12 to the sensor 13 and a nominal drop velocity of 750 inches per second, a transit time of 1 millisecond (ms) is required from the time a drop is charged until it passes by the deflection sensor.

Assume that during deflection servo time, a sequence of test charges, each produced at a different velocity, is generated. Logic 15 can count each test group as it goes by sensor 13 and select the operating point which gives the closest amplifier null. An additional series of tests can be used to 'fine-tune' the null. Using this approach the 1 ms transit time is not a major obstacle to optimum system performance.

By making the sensor plates 13a and 13b large enough to sense the highest and lowest expected drop pattern, the polarity of the amplifier 16 will always indicate whether drops are high or low.

When the sensor plates are large in comparison with the distance from the drop, the 'charge image' theory can be applied to model the charges induced on the plates.

FIGS. 6a and 6b show an alternative sensor configuration 20 comprising channel members 20a and 20b, which performs approximately the same function as the plates of FIGS. 2a and 2b. This alternative configuration produces a somewhat smaller output signal than the sensor of FIGS. 2a and 2b because the sensor plate width is narrower. However, the alignment of the gap 21 at right angles to the drop trajectory is less critical.

FIGS. 7a and 7b show sensor structure 23 which includes electrostatic shields 24a, 24c, 24d and 24f, to prevent the coupling of noise signals to the sensor plates. Elements 30 comprise a dielectric support structure.

With any of the deflection sensors discussed above it is possible during printer operation to sense the passage of charged drops on selected characters with long vertical strokes (1, 4, h, d, H, T, etc.) and thus, determine if charged drops are being properly deflected. Thus, this device also performs a failure detection function.

The planar plate sensor 35 coupled in a circuit as in FIGS. 8a and 8b makes it possible to detect changes in height of an ink stream 36a, 36b of ±2 to ±4 mils (1 mil = 0.001 in) when the sensor is located 20–24 mils from the stream. Additional gain in the circuit further improves resolution.

Figure 10:
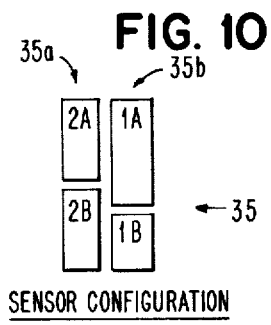
FIG. 10 illustrates a stepped sensor arrangement with output signals shown in FIG. 11.
Figure 11:
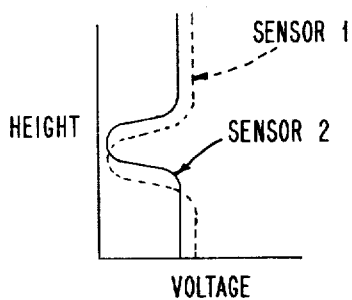
FIG. 11 shows the output signals of the arrangement of FIG. 10.

FIG. 9 illustrates typical waveforms of the output of differential amplifier 36, FIG. 8b, as a function of the height of charged ink drops in a stream. One method of overcoming resolution limits is to use the two pairs of sensor plates 35a, 35b with gaps staggered as shown in FIG. 10. With the gap between the sensors staggered, the electronic circuitry nulls only when both pairs of plates null, FIG. 11. If a single null occurs over a ±4 mil band the overlap of the two nulls could be limited to ±1.5 to ±2 mils effectively improving resolution by a factor of two or three. This approach requires additional sensing electronics as well as more control logic.

Figure 12:
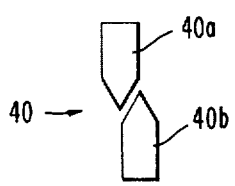
FIG. 12 and 13 show alternative tapered sensors.

The single sensor approach can also be modified as shown in FIG. 12. Here, by tapering the sensor plates 40a, 40b of sensor 40 the sensor area under the stream in the vicinity of the gap varies as a function of stream height. Since the sensor plates 40a, 40b do not necessarily lie one above the other, the output signals may be skewed in time. This can easily overcome by integrating the resultant output. This technique, with integration plus high electronics gain, can improve resolution.

Figure 13:
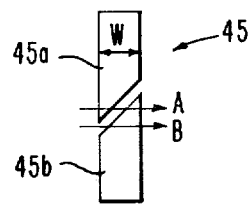
Figure 15A:
FIGS. 15a and 15b show the effect of tapered plates on the output signals in the system.

If the string of charged droplets is short compared to the width of the tapered plates 40a, 40b, then the plates themselves contribute gain to the sensor system. Referring to FIG. 13, if a group of drops of length less than W, say 0.5W, passes by the sensor 45 along path A, an equal signal will be induced on each plate. The signals will be skewed, slightly, in time, FIG. 15a.

Figure 15B:
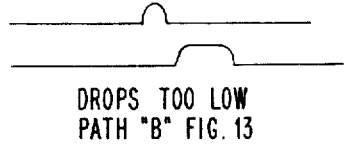

Now, if deflection is reduced, an identical group of charged drops will follow some path B. The signal induced on the upper plate 45a will be smaller in amplitude than that induced on the lower plate 45b. However, since the path over the lower plate 45b is now longer, the pulse width of the signal from plate 45b will be longer, as shown in FIG. 15b. This variation in signal pulse widths sharpens the null and allows improved resolution. The amplitudes of the two signals, skewed in time and of different durations, now must be integrated in order to effectively sense the null. This type of sensor must be wider than the types shown in FIGS. 2a, 2b, 4a, 4b, and 6a, 6b.

Figure 14:
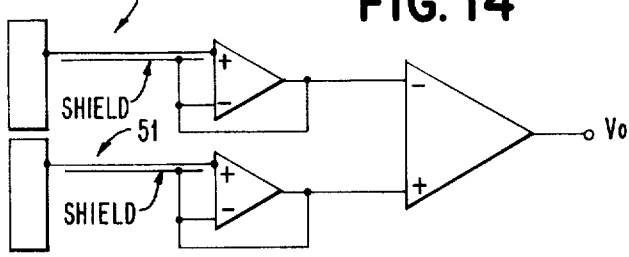
FIG. 14 illustrates a typical shielded sensor arrangement.

The resolution of all of these methods may be improved by using a 'guard voltage' technique on the shielded input lines 50, 51 as shown in FIG. 14. This technique effectively lowers input capacitance and thus reduces signal attenuation. Increased signal amplitude results in improved sensor resolution. Typically, the improvement in resolution is on the order of 10 to 1. It also enables the sensors to respond to signals produced by fewer charged drops.

Non-inverting unity gain preamplifiers 37 and 38 in FIG. 8b can be built into the deflection sensor as an integral part thereof. When constructed this way, the connections to the sensor plates 35a and 35b are short and the 10 to 1 resolution improvement can be obtained without using the 'guard voltage' technique.

Figure 16:
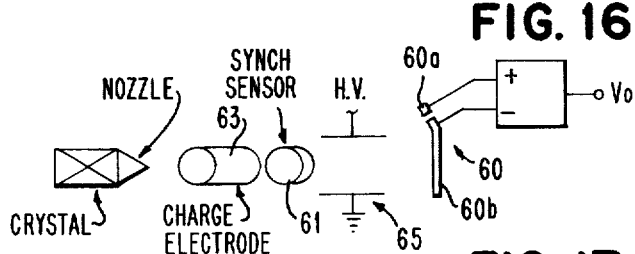
FIG. 16 illustrates an ink jet system incorporating a synchronization sensor plus a deflection sensor for use in a velocity control system.

If the bottom plate 60b of a sensor 60, as shown in FIG. 16, is tapered to a narrow length and extended down to the location of the undeflected stream; and, if a synchronization sensor 61 is located between the charge electrode 63 and the deflection plates 65; then the two elements needed for a velocity control system are obtained. Using this scheme, only the logic portion of a velocity servo loop is required.

The sensors described can be used for aligning charged but undeflected ink streams, such as on an assembly line, or after replacing a nozzle, etc. These sensors can also be utilized to align multiple nozzles accurately (and with repeatability) with respect to one another.

The sensors and electronics just described can be used in a number of other ways to control charged but not deflected ink streams (i.e., a synchronized pressure jet system with the high voltage supply off).

Figure 17A:
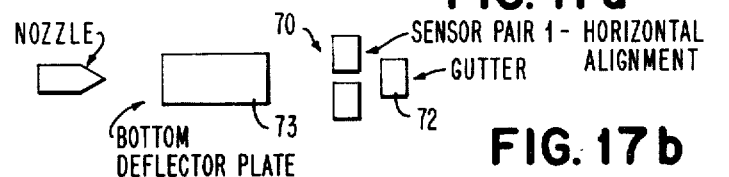
FIGS. 17a and 17b represent top and side elevations, respectively of a sensor arrangement useful during initial factory adjustment for field servicing of an ink jet printer.
Figure 17B:
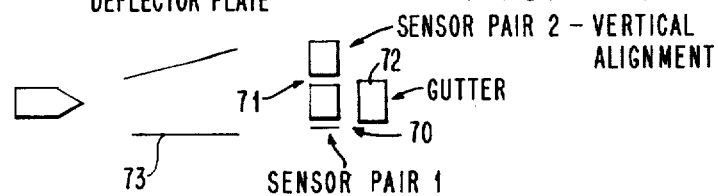

FIGS. 17a and 17b illustrate how two such sensors 70 and 71 located near a gutter 72 and at 90° angles to each other can be used to accurately sense the position of the undeflected stream. The sensors can be made by depositing a metal film on plastic parts and etching the sensor pattern and the bottom deflection plate 73 in one operation. The etching process would allow very precise positioning of the sensors with respect to the deflection plates.

A preamplifier, not shown, would be required for each pair of sensor plates, but the rest of the electronics can be the same circuitry used for the deflection control system switched from that function to a "stream adjustment mode." This allows an unskilled person on the assembly line or a field engineer to easily install and adjust a nozzle.

For example, if the field engineer installs a new nozzle, he can remove the deflection plates and use sensor 70 of FIGS. 17a and 17b to adjust the X (left-right) adjustment of the stream and at the same time do a coarse adjustment by visually adjusting in the vertical direction. Then he can reinstall the deflection assembly and do a fine adjustment on the vertical position using sensor 71 of FIGS. 17a and 17b, all a simple, accurate, and repeatable process.

These sensors can also be used to repeatably adjust streams from multiple nozzle machines with respect to one another. Again the precision and repeatability of the adjustment offers advantages when compared with optical or other techniques.

It is feasible to have a machine adjust its own stream if a suitable electromechanical technique for automatic aiming of the nozzle is set up.

Typical resolution of a sensor is ±0.001 in. with a 0.007 in. gap sensor located 0.02 in. from the stream sensing passage of 10 drops each charged to $6 \times 10^{-13}$ coulombs, which can be further optimized. If the sensor is located 0.75 in. from the nozzle then the nozzle can be aimed with an angle error of:

$$\theta = \text{ArcTan} \pm \frac{.001}{.750} \pm .075°$$

This technique can also be applied to a multinozzle line printer to provide simple, accurate and repeatable means to adjust an array of 66 nozzles, for example, so that they can all print characters on the same horizontal line as at the same height and with proper horizontal spacing between characters.

In general, the sensing scheme can be applied to adjusting any charged stream with a high degree of accuracy and repeatability. Also, if the machine has a deflection control system, most of the electronics required will already be available in the machine, so the addition of an adjustment means will not be expensive.

The deflection sensor can also be used as a synchronization sensor. In this mode very small charges are placed on ink drops, just enough charge to be detected by the sensor but not enough to cause the test drops to be deflected above the gutter. The lower sensor plate extends below the undeflected stream and collects the signal from the synchronization test drops. This technique eliminates the need for a separate synchronization sensor 61 as shown in FIG. 16. Measurement time is increased, however, due to the longer droplet transit time from the charge electrode to the deflection sensor.

While the invention has been particularly shown and described with reference to several embodiments, it will be understood by those skilled in the art that various changes in form and detail may be made without departing from the spirit and scope of the invention.

What is claimed is:

1. A deflection sensing apparatus for ink jet printers, and the like, comprising:
   nozzle means for forming and propelling a stream of ink drops, charging means for selectively charging said ink drops, and deflecting means for deflecting said ink drops in accordance with the charge on said drops in at least one predetermined path;
   logic means interconnected with said charging means and operable to activate said charging means to charge selected ones of said drops so that they are deflected by said deflection means in a test path that is displaced from said predetermined path, said drops generally travelling in said test path but being subject to deviation therefrom;
   sensor means positioned in a test location downstream from said nozzle means and in proximity to said test path, and positioned for sensor coupling with drops proceeding in said test path, said sensor means comprising a pair of planar sensor plates separated by a reference gap, said reference gap being located directly adjacent said test path whereby passage of ink drops in said test path induces signals representative of charges on said drops in said sensor plates due to coupling between said drops and said sensor plates and in accordance with the relative deviation of said drops from said test path with respect to said sensor plates, the passage of drops past said reference gap providing a null indication; and
   circuit means comprising a differential amplifier and means interconnecting said sensor plates with said circuit means to develop signals for controlling said ink jet stream.

2. The apparatus of claim 1, wherein:
   said sensor plates in said sensor means are arranged at a predetermined angle with respect to one another, the apex of the angle being arranged in proximity to said test path.

3. The apparatus of claim 1, wherein said sensor means comprises:
   a pair of cooperating channel elements serving as the first and second sensor plates, respectively, of said sensor means.

4. The apparatus of claim 1, wherein said sensor means comprises:
   a pair of laminated assemblies serving as said first and second sensor plates, each of said assemblies comprising alternate conductive and dielectric laminations, certain of said layers serving as shield elements.

5. The apparatus of claim 1, further comprising:
   an additional sensor means positioned in said test path further downstream from and in proximity to said first recited sensor means, said additional sensor means comprising first and second portions providing a gap, with the gaps of said first named sensor means and said additional sensor means being offset relative to said test path.

6. The apparatus of claim 1, wherein said sensor means comprises:

mating tapered plates forming a gap at an angle with respect to vertical.

7. The apparatus of claim 1, wherein:
a group of ink drops selected as a test group is relatively short compared to the width $W$ of the sensor plates whereby the sensor portions themselves contribute gain to the sensor system.

8. The apparatus of claim 1, further comprising:
an additional amplifier circuit interposed between each of said sensor portions and said differential circuit, the inputs to each said differential circuit comprising shielded input lines; and
means for applying a guard voltage to each of said shielded input lines to improve resolution.

9. The apparatus of claim 1 wherein one of said sensor plates of said sensor means is elongated with respect to the other of said plates of said sensor means and extends in said predetermined path of travel of ink drops; and further comprising:
a synchronization sensor positioned downstream from said nozzle means and in proximity to said predetermined path of travel of said ink drops; and
means interconnecting said elongated plate of said sensor means and said synchronization sensor in a velocity servo system.

10. The apparatus of claim 1, further comprising:
an additional sensor means comprising first and second sensor plates arranged at right angles with respect to said recited first sensor means and its first and second sensor plates, the respective sensor means each providing a gap past which ink drops are directed during sensing procedures.

11. A deflection sensing apparatus for ink drops and the like, comprising:
nozzle means for forming and propelling a stream of ink drops, charging means for selectively charging said ink drops, deflecting means for deflecting said ink drops in accordance with the charge on said drops in at least one test path, said drops generally travelling in said test path but being subject to deviation therefrom;
sensor means positioned in a test location downstream from said drop generating means and in proximity to said test path, said sensor means comprising a pair of planar sensor plates separated by a reference gap, said reference gap being located directly adjacent said test path whereby passage of ink drops in said test path induces signals in said sensor plates representative of charges on said drops due to coupling between said drops and said sensor plates and in accordance with the relative deviation of said drops from said test path with respect to said sensor plates, the passage of drops past said reference gap providing a null indication; and
circuit means comprising a differential amplifier and means interconnecting said sensor plates with said circuit means to develop signals for controlling said stream of ink jet drops.

* * * * *